(12) United States Patent
Prasad et al.

(10) Patent No.: US 6,751,301 B1
(45) Date of Patent: Jun. 15, 2004

(54) ADMINISTRATION TOOL FOR SUPPORTING INFORMATION TECHNOLOGY (IT) SYSTEM MIGRATIONS

(75) Inventors: Venkatesha Prasad, King of Prussia, PA (US); Richard Lolla, Malvern, PA (US); Lucy Winter, Elkins Park, PA (US); Thomas Mahaney, Lincoln University, PA (US)

(73) Assignee: Unisys Corporation, Blue Bell, PA (US)

( * ) Notice: Subject to any disclaimer, the term of this patent is extended or adjusted under 35 U.S.C. 154(b) by 121 days.

(21) Appl. No.: 10/039,775

(22) Filed: Oct. 19, 2001

(51) Int. Cl.[7] .................................................. H04M 1/64
(52) U.S. Cl. .................................. 379/88.18; 379/88.08
(58) Field of Search .................... 379/88.01–88.04, 379/88.07–88.14, 88.16, 88.17, 88.18, 88.19, 88.22, 88.23, 88.25, 88.26, 88.27, 67.1

(56) References Cited

U.S. PATENT DOCUMENTS

| | | | | |
|---|---|---|---|---|
| 4,790,003 A | * | 12/1988 | Kepley et al. | 379/88.18 |
| 4,933,967 A | * | 6/1990 | Lo et al. | 379/88.22 |
| 4,935,954 A | * | 6/1990 | Thompson et al. | 379/88.04 |
| 5,172,404 A | * | 12/1992 | Hashimoto | 379/88.18 |
| 5,220,596 A | * | 6/1993 | Patel | 379/93.24 |
| 5,444,768 A | * | 8/1995 | Lemaire et al. | 379/68 |
| 5,461,665 A | * | 10/1995 | Shur et al. | 379/88.27 |
| 5,627,877 A | * | 5/1997 | Penttonen | 455/413 |
| 5,646,981 A | * | 7/1997 | Klein | 379/88.17 |
| 5,647,002 A | * | 7/1997 | Brunson | 709/206 |
| 5,659,599 A | * | 8/1997 | Arumainayagam et al. | 379/67.1 |
| 5,822,405 A | * | 10/1998 | Astarabadi | 379/88.04 |
| 5,909,483 A | * | 6/1999 | Weare et al. | 379/88.18 |
| 5,915,004 A | * | 6/1999 | Pabbati et al. | 379/100.08 |
| 6,005,922 A | * | 12/1999 | Longster et al. | 379/88.18 |
| 6,208,717 B1 | * | 3/2001 | Yeh et al. | 379/88.18 |
| 6,356,977 B2 | * | 3/2002 | Ofek et al. | 711/112 |

* cited by examiner

Primary Examiner—Roland G. Foster
(74) Attorney, Agent, or Firm—Michael B. Atlass; Mark T. Starr; Woodcock Wasburn LLP

(57) ABSTRACT

A computer-based administration tool migrates user's names and greetings from a first voice mail system to a second voice mail system. Illustratively, the administration tool accesses the first voice mail system for recording, or storing, each of a plurality of users names and greetings. The administration tool then sends them to the second voice mail system for use therein.

13 Claims, 8 Drawing Sheets

ADMINISTRATION TOOL FOR SUPPORTING INFORMATION TECHNOLOGY (IT) SYSTEM MIGRATIONS

FIELD OF THE INVENTION

This invention relates generally to information technology (IT) and, more particularly, to administration of IT systems and applications.

BACKGROUND OF THE INVENTION

Some information technology (IT) systems—such as voice mail system—require individual administration items, or data, for their users and also allow the users to personalize some of these administration items. For example, in a voice mail system a user typically personalizes the name they want to use and/or their greeting message by selectively recording these administration items. (It should be noted that in some voice mail systems a system administrator may initially set up a user's account and record the user's name and set a default (voice mail system defined) greeting).

Unfortunately, if the voice mail system is changed—these administration items may have to be re-done from scratch causing an inconvenience to the users and incurring a cost to the owners of the voice mail system. While the inconvenience and costs may be tolerable for small size voice mail systems, which support a small numbers of users, they can be significant for large size voice mail system supporting thousands of users.

SUMMARY OF THE INVENTION

In accordance with the invention, a computer-based administration tool migrates user data from a first IT system to a second IT system. In particular, the administration tool stores administration data for a plurality of users registered on the first IT system; and then sends the stored administration data to the second IT system.

In an embodiment of the invention, an administration tool migrates user's names and greetings from a first voice mail system to a second voice mail system. Illustratively, the administration tool accesses the first voice mail system for recording, or storing, each of a plurality of users names and greetings. The administration tool then sends them to the second voice mail system for use therein.

DETAILED DESCRIPTION

Figure 1:
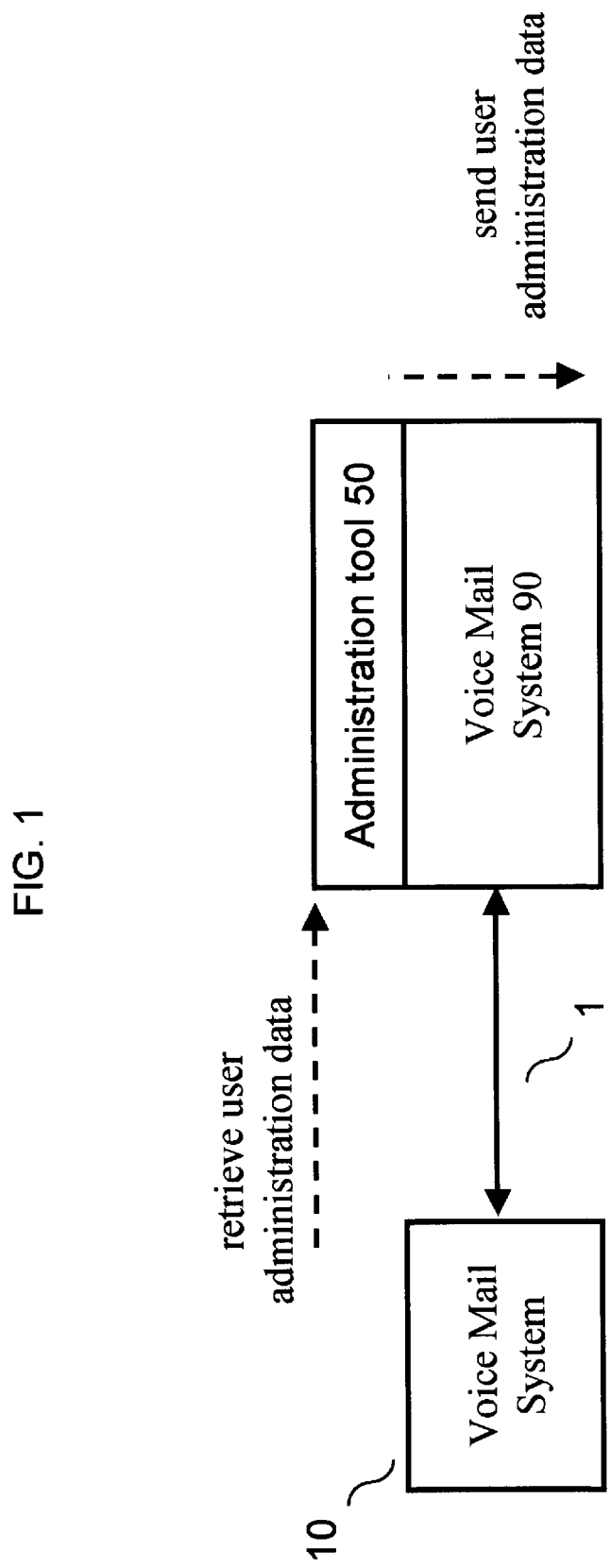
FIG. 1 shows an illustrative block diagram of a system in accordance with the principles of the invention.

A system in accordance with the principle of the invention is shown in FIG. 1. Other than the inventive concept, the elements shown in FIG. 1 are well known and will not be described in detail. For example, although shown as a single element, a voice mail system comprises stored-program-control processor(s), storage elements such as memory and hard disk drives, and appropriate interface card(s). Familiarity with voice mail system technology is assumed (e.g., concepts such as playing-out a message will not be described herein). As used herein, a voice mail system refers either to a computer platform running a voice mail application coupled to a switching element (e.g., a private branch exchange (PBX)) or, equivalently, to a switching element (e.g., PBX) with an integrated voice mail application. In addition, path 1 is a bi-directional path representative of any one of a number of mechanisms for coupling equipment, or applications, together, e.g., a direct, hard-wired connection; a wireless connection; a switched-access connection, e.g., dial-up through the public switched network (PSTN) or a PBX; a data connection, e.g., via an intra-net or internet; etc. The inventive concept is implemented using conventional programming techniques (including voice processing, recording, generation of dual-tone multi-frequency (DTMF) tones, etc.), which as such, will not be described herein. As used herein, the term "computer program product" represents any mechanism for storing a computer program, e.g., a floppy diskette; a CD-ROM; a file, or files, in compressed and/or uncompressed from, representing the computer program; etc. The term "machine" refers to any stored-program-control processor-based equipment.

In accordance with the invention, a computer-based administration tool, as represented by administration tool 50 of FIG. 1, migrates user data from a first IT system, as represented by voice mail system 10 of FIG. 1, to a second IT system, as represented by voice mail system 90 of FIG. 1. In particular, the administration tool 50 retrieves administration data for a plurality of users registered on voice mail system 10; and then sends the retrieved administration data to voice mail system 90. In this illustrative embodiment, administration tool 50 is a computer program, or application, that runs on voice mail system 90 and the administration data is illustratively a name and greeting.

Figure 2:
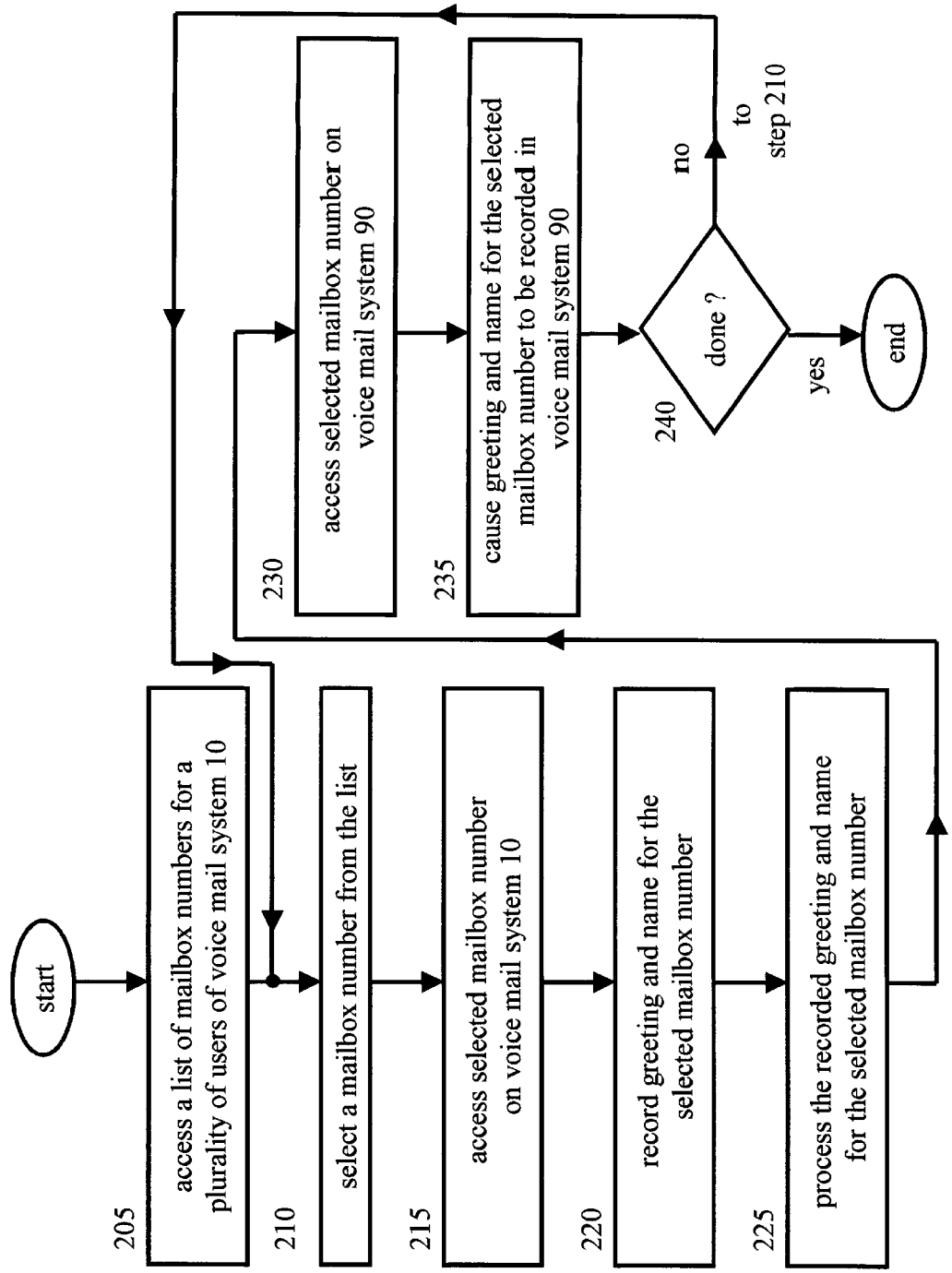
FIG. 2 shows an illustrative flow chart in accordance with the principles of the invention.

Reference now should also be made to FIG. 2, which shows an illustrative flowchart for use by administration tool 50 in performing the system migration. In step 205, a list (not shown) of the mailbox numbers (or extensions) of the plurality of users currently registered on voice mail system 10 is accessed on voice mail system 90. In this example, each user is associated with at least one mailbox number. (It should be noted that the inventive concept does not require that the list include all of the users of voice mail system 10, nor does it require that a user have only one mailbox number.) This list is created beforehand in any number of known ways from the a priori known directory information of voice mail 10 and is not discussed herein (e.g., spreadsheet data, an extensive-markup-language (XML) file, a text file, etc.). Instep 210, a mailbox number is selected from the list (e.g., the process begins with the first mailbox number on the list). In step 215, administration tool 50 accesses the selected mailbox number on voice mail system 10, via path 1, (e.g., makes a call from voice mail system 90 to the mailbox number (for switched-access, this may require first dialing a predetermined telephone number for accessing voice mail system 10)) and monitors and records the associated greeting and the associated name played out by voice mail system 10 in step 220 to form the recorded greeting and the recorded name.

In terms of recording, or storing, a greeting and name, for the purposes of this description, it is assumed that voice mail system 10 operates as follows. In particular, upon receiving a call to access and leave a message to the selected mailbox number, voice mail system 10 plays-out the associated greeting along with a "beep" tone and then waits to record a message for the selected mailbox. As such, initially, the recorded, or stored, greeting formed by administration tool 50 also includes this "beep" tone. At this point, administration tool 50 provides a predefined escape sequence for voice mail system 10 (e.g., DTMF tones representing a * and # followed by the DTMF digits representing the selected mailbox number) to voice mail system 10 to cancel the message deposit and enter the equivalent of a user administration mode. In response, voice mail system 10 plays-out the user name associated with the mailbox and plays an associated prompt such as "Please enter your Password" both of which are recorded by administration tool 50 as part of the recorded, or stored, name. (It should be noted that other voice mail systems may operate differently, i.e., have different "call flows," then described above and the methods of accessing the name and greeting need to be suitably adjusted. All voice mail systems have documented call flows, which detail user interaction, e.g., press "4" for greetings, then press "1" to record name, etc.)

Since additional, or extraneous, information, other than the desired name and greeting, have been recorded in step 220, administration tool 50 further processes the recorded greeting and recorded name in step 225 to remove this extraneous information. In this case, administration tool 50 removes both the associated "beep" tone from the recorded greeting, and the associated prompt "Please enter your Password" from the recorded name. (It should be noted that step 225 was shown for completeness. Extraneous information, if any, is typically known a priori since the call flow or user interaction with a voice mail system is predefined as noted in the above example for voice mail system 10. It may be the case that additional processing of the recorded greeting and/or recorded name is not necessary.)

It should be noted that other equivalent steps may be used in place of, or in addition to, those described above. For example, use of speech recognition to detect particular phrases to initiate recording, or subsequent to recording erasing predetermined amounts of the recorded material (e.g., if it is known that the first five seconds of the recording is not needed, simply removing this time portion of the recording), etc. It should also be noted that if password information is available on voice mail system 10, additional information can also be retrieved.

Figure 3:
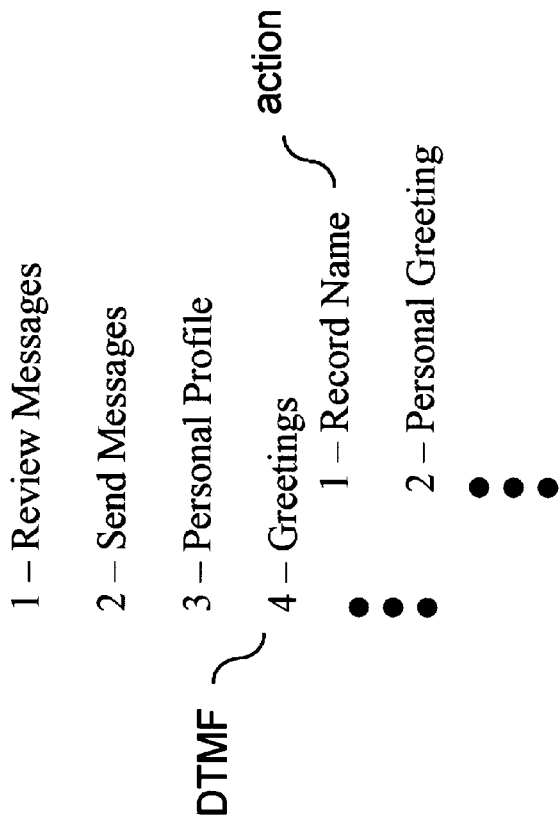
FIG. 3 shows an illustrative call flow.

Returning to FIG. 2, administration tool 50 then sends the recorded name and recorded greeting to voice mail system 90 for use therein in steps 230 and 235. (It is assumed that the mailbox numbers on voice mail system 90 have been a priori administered.) In sending the administration items to voice mail system 90, administration tool 50 follows the predefined call flows for voice mail system 90. An illustrative portion of such call flows is shown in FIG. 3. For example, for recording a name a DTMF digit of 4 followed by a DTMF digit of 1 is used, etc. It is assumed that the requisite permissions, or password information is known a priori for voice mail system 90. (For example, since voice mail system 90 is being initialized, all mailboxes may have a known default password, such as the mailbox number itself.) (Alternatively, administration tool 50 can directly modify the associated data base of voice mail system 90, or perform library-type calls to voice mail system 90 by passing the mailbox number, name and greeting as parameters.) In step 240, administration tool 50 checks if the end of the list has been reached (e.g., has an end-of-file (EOF)) delimiter been detected). If the end of the list has not been detected, then administration tool 50 repeats steps 210 through 235 for the next mailbox number on the list. On the other hand, if the end of the list has been detected, the retrieval of the administration data for the plurality of the users ends.

Thus, as illustratively described above, administration tool 50 automatically migrates user administration data from voice mail system 10 to another voice mail system 90.

Figure 4:
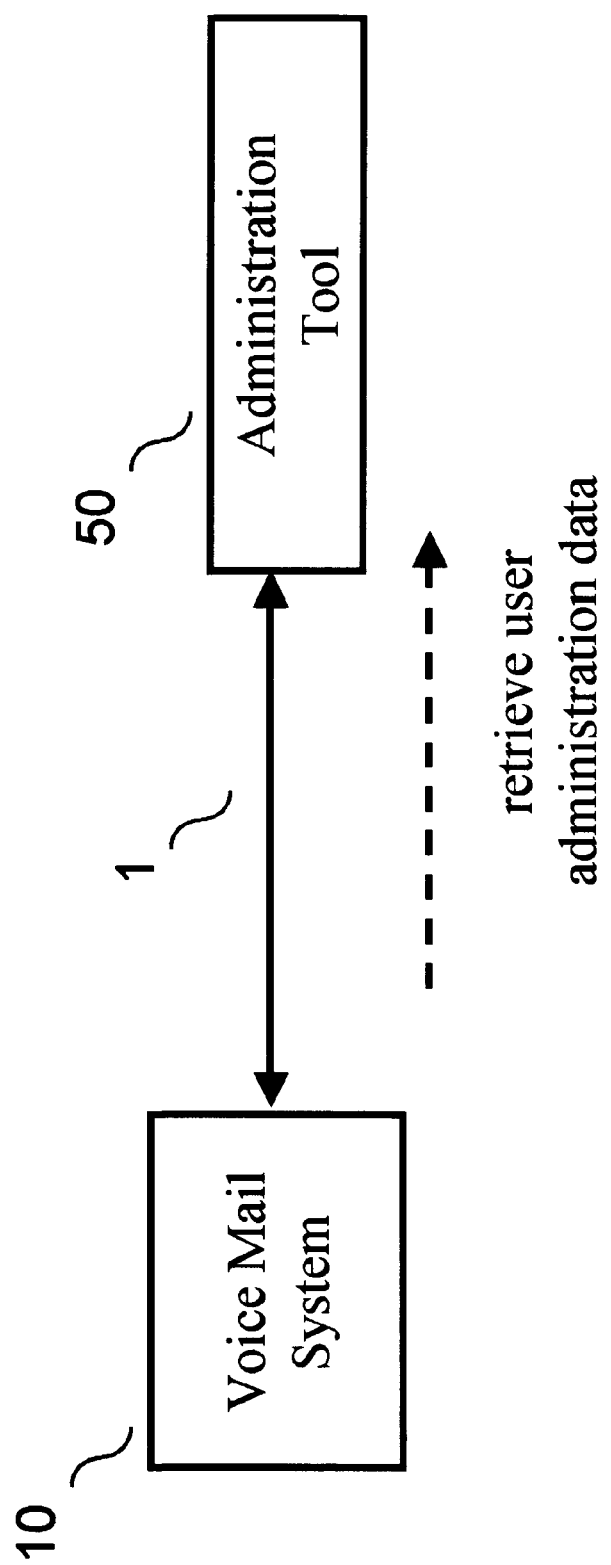
FIG. 4 and 5 show illustrative block diagrams of another system in accordance with the principles of the invention.
Figure 5:
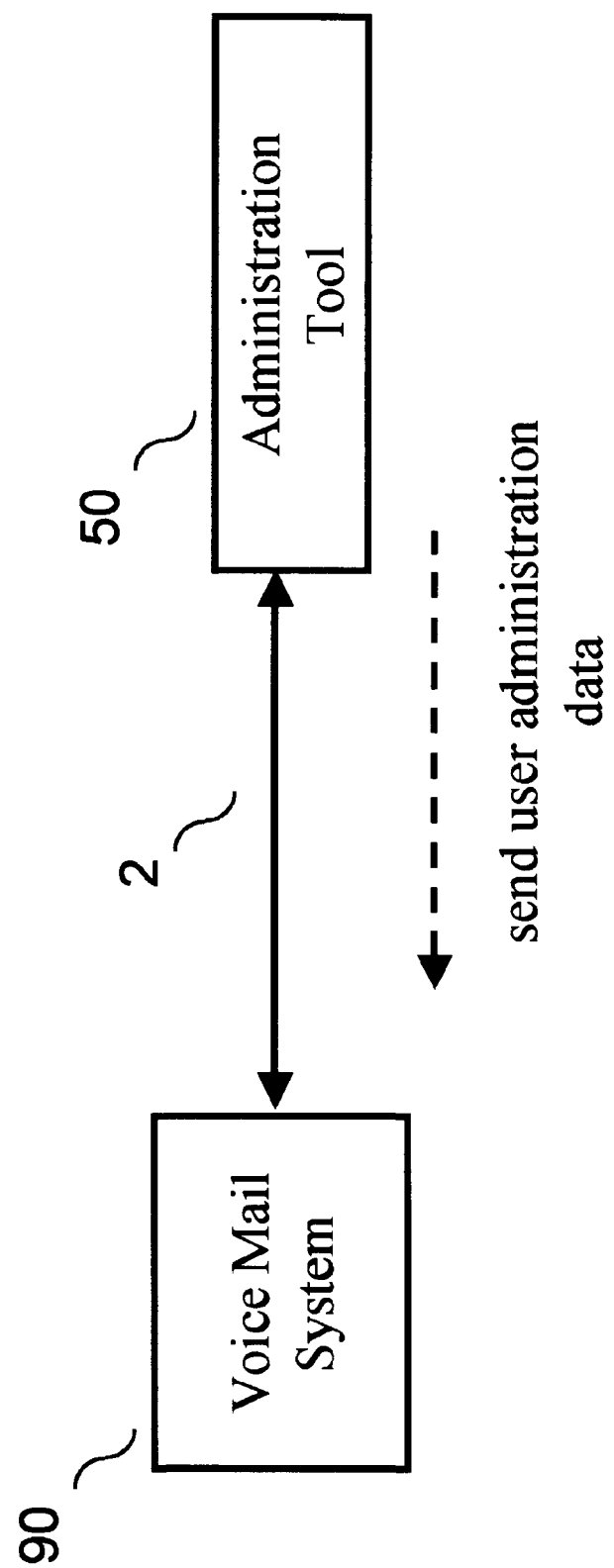

Another illustration of an automatic migration system is shown in FIGS. 4 and 5. Like numbers indicate like elements and are not described further. Other than the inventive concept, the elements shown in FIGS. 4 and 5 are well known and will not be described in detail. Path 2 of FIG. 5 is similar to path 1 of FIGS. 1 and 4. In this example, administration tool 50 comprises a computer platform (described below) that is separate from voice mail system 10 and voice mail system 90. FIG. 4. illustrates administration tool 50 retrieving the administration data for a plurality of users from voice mail system 10, via path 1, and FIG. 5 illustrates administration tool 50 sending this administration data to voice mail system 90, via path 2.

Figure 6:
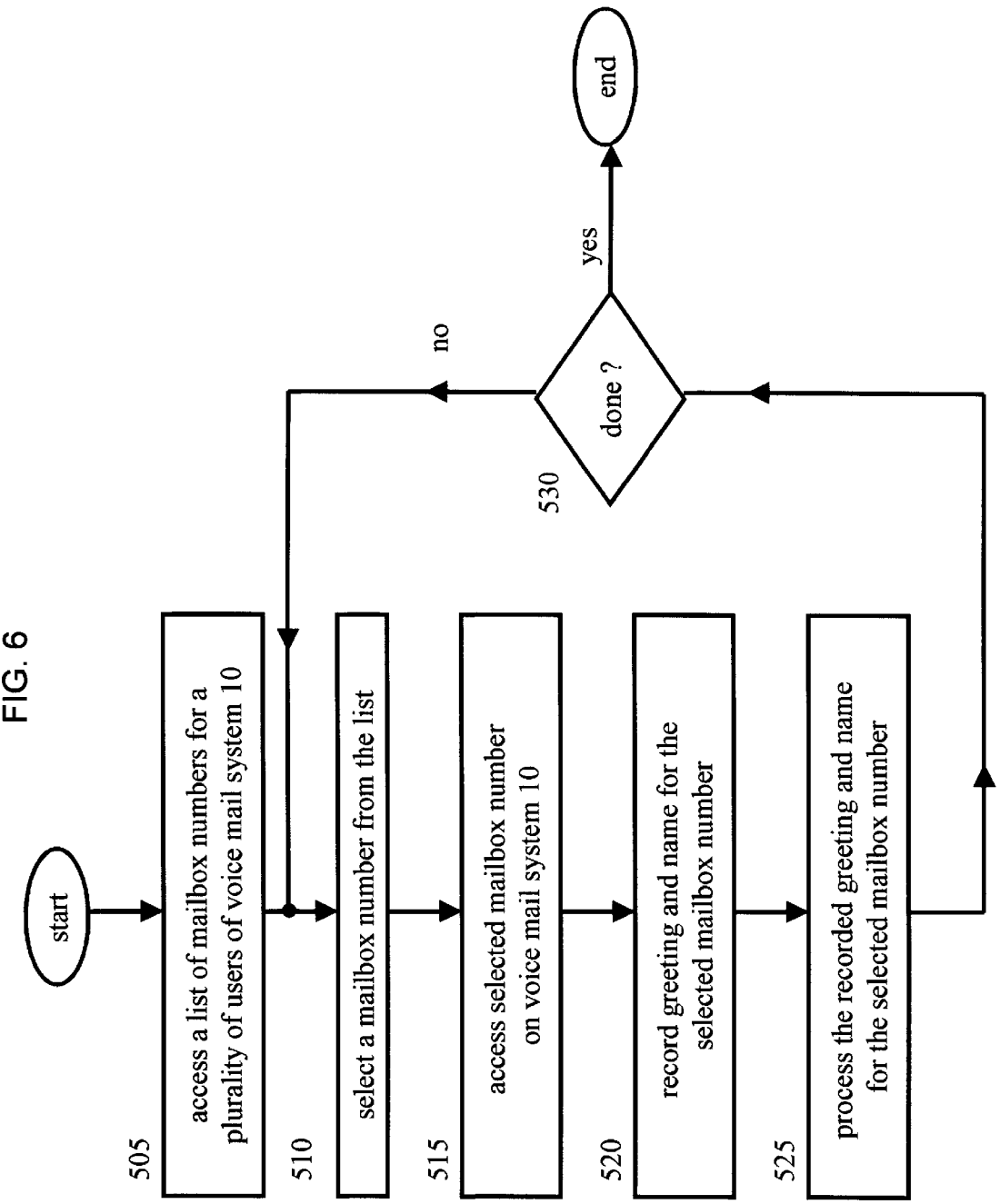
FIGS. 6 and 7 show illustrative flow charts for use in the system of FIGS. 4 and 5.
Figure 7:
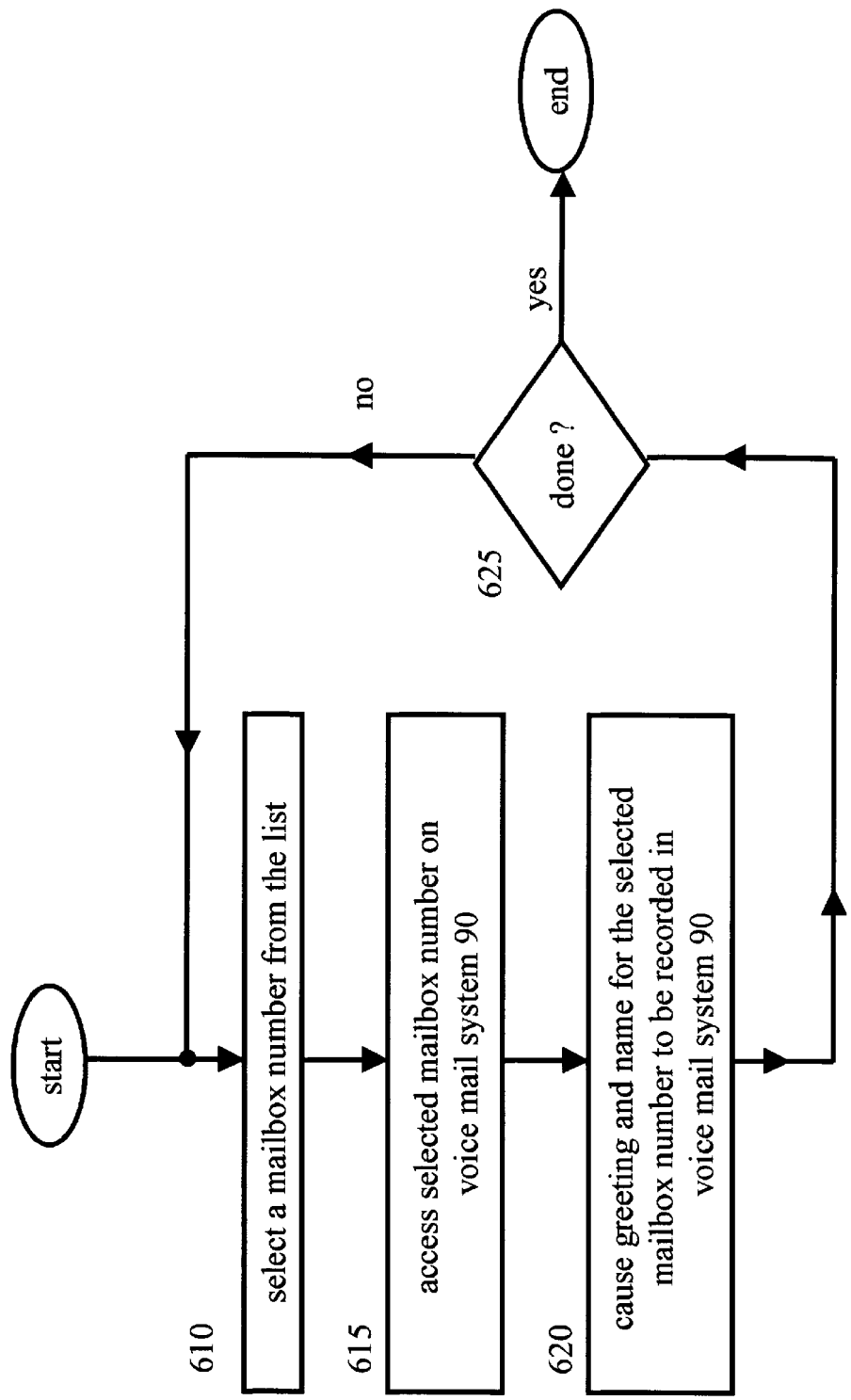

Reference now should also be made to FIGS. 6 and 7, which show illustrative flowcharts for use by administration tool 50 of FIGS. 4 and 5 in performing the system migration. Turning first to FIG. 6, a method is shown for automatically retrieving the administration data for the plurality of users. This method is similar to steps 205 through 225 of FIG. 2 except that automatic tool 50 first retrieves all of the administration data for the plurality of users before migrating the administration data to voice mail system 90. Once the administration data for the plurality of users is retrieved, administration tool 50 then sends the retrieved administration data to voice mail system 90 via steps 610, 615 and 620 as illustrated in FIG. 7 (these steps are similar to steps 210, 230, 235 and 240, and are not described further herein). (It should be noted that although this illustrative embodiment describes first retrieving the administration data for the plurality of users from the first voice mail system and, then, sending the administration data for the plurality of users to the second voice mail system, other variations are possible. For example, like the flow chart shown in FIG. 2, a user name and greeting can be retrieved from the first voice mail system and then sent to the second voice mail system before moving on to the next mailbox number.)

Although not described above, the flow charts described herein can be suitably modified to include exception, or error, reporting. For example, if administration tool 50 selects a mailbox number to which voice mail system 10 does not respond, this can be entered into an error file and administration tool 50 then moves onto the next mailbox number. Subsequently, such an error file can then be used to either correct errors, e.g., in the original list of mailbox numbers, and retry the process on a reduced list of mailbox numbers, or perform a manual administration of the associated user's account on voice mail system 90.

Figure 8:
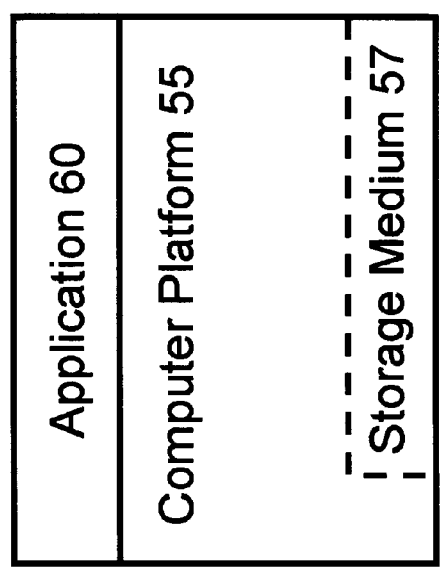
FIG. 8 shows another illustrative block diagram of an administration tool in accordance with the principles of the invention.

Turning briefly to FIG. 8, an illustrative architecture for an administration tool 50 such as shown in FIGS. 4 and 5 is shown. Other than the inventive concept, the elements shown in FIG. 8 are well known and will not be described in detail. Administration tool 50 comprises an application 60 (which executes, e.g., the flow charts illustrated in FIGS. 6 and 7) residing on a computer platform 55, which comprises a storage medium 57 (e.g., hard disk or memory for use by application 60). Computer platform 55 is a stored-program-control based processor architecture and includes (the following is not shown in FIG. 8) a processor, communications interface(s) for coupling to, e.g., paths 1 and 2, and for performing voice processing technology such as, but not limited to, voice detection, DTMF generation, voice recording, and voice editing.

As described above, the inventive concept simplifies and automates the migration of user-specific administration items from one IT system to another IT system. Indeed, this process provides a more friendly migration than a "slash" cut since it preserves the user's recorded name and greeting from the first IT system. As a result, any inconvenience and associated migration costs in changing IT systems can be reduced.

The foregoing merely illustrates the principles of the invention and it will thus be appreciated that those skilled in the art will be able to devise numerous alternative arrangements which, although not explicitly described herein, embody the principles of the invention and are within its spirit and scope. For example, consider the following. The invention is also applicable in a straightforward manner to other forms of IT systems, e.g., e-mail systems that store user-specific preferences, etc. Similarly, the invention is also applicable to migrating other information, even information that is password protected (e.g., additional greetings). In the latter case, the list of mailbox (or extension numbers) includes the associated password and suitable prompting is added to the interaction between administration tool 50 and voice mail system 10 in accordance with the predefined call flow for voice mail system 10. Also, the association of mailboxes to users on the first IT system may be different than the associations on the second IT system. In this case, the above-mentioned mail box list is suitably modified to enable a translation from a mailbox number used on the first IT system to the correct mailbox number on the second IT system.

What is claimed:

1. An administration tool in the form of a computer program product, readable by at least one machine, embodying a program of instructions executable by the at least one machine for performing a method for use in migrating from a first voice mail system to a second voice mail system, the method comprising the steps of:

storing administration data for a plurality of users registered on the first voice mail system;

processing the administration data to remove extraneous information; and sending the processed administration data for the plurality of users to the second voice mail system.

2. The product of claim 1 further comprising, before the storing step, the steps of:

accessing, on the first voice mail system, the administration data for the plurality of users; and retrieving the administration data for the plurality of users.

3. The product of claim 2 wherein the steps are performed such that as administration data for each of the plurality of users is retrieved from the first voice mail system it is then sent to the second voice mail system.

4. The product of claim 1 wherein the administration data comprises, for each of the plurality of users, an associated name and greeting and wherein the storing step records the associated name and greeting.

5. A method for use by an administration tool in migrating from a first voice mail system to a second voice mail systems, the method comprising the step of:

accessing the first voice mail system for retrieving administration items for each of a plurality of users; and recording the retrieved administration items for each of the plurality of users;

processing the recorded administration items for each of the plurality of users; and sending the processed recorded administration items for each of the plurality of users to the second voice mail system.

6. The method of claim 5 wherein the steps are performed such that as administration items for each of the plurality of users are retrieved from the first voice mail system they are then sent to the second voice mail system.

7. The method of claim 5 wherein the administration items comprise, for each of the plurality of users, an associated name and greeting and wherein the recording step records the associated name and greeting.

8. The product of claim 2 wherein the steps are performed such that the administration tool first retrieves all of the administration data for the plurality of users from the first voice mail system before sending the administration data to the second voice mail system.

9. The product of claim 5 wherein the steps are performed such that the administration tool first retrieves all of the administration data for the plurality of users from the first voice mail system before sending the administration to the second voice mail system.

10. A voice mail migration system, comprising:

a first voice mail system and a second voice mail system; and an administration tool connected to the first voice mail system and to the second voice mail system, for accessing, retrieving, recording, and sending administration data between the first voice mail system and the second voice mail system, where the administration data is processed by the administration tool to remove extraneous information.

11. The voice mail migration system of claim 10 wherein the administration tool comprises a computer program that runs on the second voice mail system.

12. The voice mail migration system of claim 10 wherein the administration tool comprises an application residing on a computer platform, which comprises a storage medium, where the computer platform is a stored program-control based processor architecture and includes a processor and at least one communications interface.

13. The voice mail migration system of claim 10 wherein the administration data comprises, for each of the plurality of users, an associated name and greeting.

\* \* \* \* \*